(12) United States Patent
Lowson et al.

(10) Patent No.: US 7,364,219 B2
(45) Date of Patent: Apr. 29, 2008

(54) SWING AND SLIDE DOOR

(75) Inventors: Martin V. Lowson, Bristol (GB); Paul Bailey, Sarold (GB); Christopher V. Cook, Warks (GB)

(73) Assignee: Advanced Transport Systems, Limited (GB)

( * ) Notice: Subject to any disclaimer, the term of this patent is extended or adjusted under 35 U.S.C. 154(b) by 152 days.

(21) Appl. No.: 10/501,535

(22) PCT Filed: Jan. 16, 2003

(86) PCT No.: PCT/GB03/00144

§ 371 (c)(1),
(2), (4) Date: Dec. 22, 2004

(87) PCT Pub. No.: WO03/061999

PCT Pub. Date: Jul. 31, 2003

(65) Prior Publication Data

US 2005/0116496 A1 Jun. 2, 2005

(30) Foreign Application Priority Data

Jan. 17, 2002 (GB) ................... 0201092.4

(51) Int. Cl.
*B60J 5/06* (2006.01)
(52) U.S. Cl. .............. 296/155; 296/146.1; 296/146.12; 296/146.11; 49/218
(58) Field of Classification Search ............ 296/146.1, 296/155, 146.4, 146.12, 146.11; 49/216, 49/218, 219, 220
See application file for complete search history.

(56) References Cited

U.S. PATENT DOCUMENTS

| | | | | | |
|---|---|---|---|---|---|
| 4,631,894 | A | * | 12/1986 | Jerila ...................... | 52/800.13 |
| 5,398,988 | A | * | 3/1995 | DeRees et al. ............. | 296/155 |
| 6,036,257 | A | * | 3/2000 | Manuel ...................... | 296/155 |
| 6,565,144 | B1 | * | 5/2003 | Crean ......................... | 296/168 |
| 6,948,765 | B2 | * | 9/2005 | Tong et al. ............... | 296/146.4 |
| 7,008,514 | B2 | * | 3/2006 | Matsumura et al. ........ | 196/155 |
| 2003/0218358 | A1 | * | 11/2003 | Hahn ......................... | 296/155 |
| 2006/0061135 | A1 | * | 3/2006 | Oxley et al. ................ | 296/155 |

FOREIGN PATENT DOCUMENTS

EP 0 312 450 4/1989
FR 2804380 8/2001

OTHER PUBLICATIONS

PCT Search Report for GB/2003/00144, mailed Apr. 22, 2003.

* cited by examiner

*Primary Examiner*—Jason Morrow
(74) *Attorney, Agent, or Firm*—MH2 Technology Law Group LLP

(57) ABSTRACT

A door (6), for example in a vehicle, is mounted at one edge (8) for acurate movement about the axis of a shaft (16), and at the other edge (10) for displacement substantially in the plane of the door opening along rails (26, 28). Thus, on opening, the edge (8) swings outwards from the door opening before moving longitudinally away from the door opening, with the edge (10) being guided along the rails (26 and 28).

12 Claims, 4 Drawing Sheets

SWING AND SLIDE DOOR

This invention relates to a door, and is particularly, although not exclusively, concerned with a door for a vehicle.

Sliding doors for vehicles are well known, in particular for providing passenger access to road and rail passenger vehicles. On opening, such doors move linearly into cavities in the vehicle structure on one or both sides of the door aperture. There are also so-called swing plug doors which are mounted on a swinging mechanism which enables them to swing outwardly and to the side of the door aperture. Some swing plug doors also have a sliding mechanism to enable the door to slide over the outside of the vehicle structure Doors which slide into cavities in the vehicle structure require a substantial amount of space to the side of the door aperture to accommodate the door. Such doors can therefore be used in railway vehicles, but they are inappropriate for shorter vehicles which do not have space for the cavities.

Swing plug doors do not require the vehicle structure to extend significantly beyond the door aperture unless they also incorporate a sliding mechanism for increasing the lateral displacement of the door after it has moved outwardly of the door aperture. However, swing plug doors employ a lever arrangement to support the door and control its movement, and this mechanism often encroaches substantially into the interior of the vehicle when the door is closed. Such systems are consequently also inappropriate for use in small vehicles.

According to the present invention there is provided a door mounted on a structure for displacement between an open position and a closed position with respect to a door aperture in the structure, the door being connected to the structure by first guide means, which constrains a leading edge of the door, with respect to movement towards the open position, to execute an arcuate movement about an axis which is fixed with respect to the structure, and by second guide means, which constrains a trailing edge of the door to execute a linear movement substantially parallel to the plane of the door aperture.

In this specification reference to "leading" and "trailing" edges of the door refer to movement of the door during opening.

The first guide means may comprise a door control lever which is pivotable at one end about an axis which is fixed with respect to the structure and which is pivotably connected at the other end to the door adjacent the leading edge. The axis about which the lever pivots may be substantially upright.

Drive means may be provided for moving the door between the open and closed positions. The drive means may be mounted so as to rotate the door control lever, for example by acting on a drive element such as a lever or gear wheel which projects from the axis and is rigidly connected to the door control lever.

In order to enhance the stability of the door, two door control levers may be provided. They may be fixed rigidly to a common shaft which defines the axis about which the door control levers move. The door control levers may have the same length as each other between the common shaft and the pivotal connection with the door.

The second guide means may comprise a guide element which is mounted adjacent the trailing edge of the door and which is slidable along a guide track, for example in the form of a rail, which is fixed to the structure. The guide track may lie in a plane which is perpendicular to the axis of the arcuate movement controlled by the first guide means. Thus, if that axis is generally upright, the guide track will extend generally horizontally, and parallel to the plane of the door opening.

The second guide means may comprise two of the guide tracks, for example disposed adjacent the top and bottom of the door. The guide tracks may lie in a common plane which is inclined to the axis of arcuate movement.

The door may be curved, or otherwise shaped, so that different portions of the door lie in different planes. For example, the upper portion of the door may be displaced inwardly (with respect to the structure) relatively to the lower part of the door. For example, the door, in its upper region, may be curved about a generally horizontal axis. With such a configuration, the door may flex under the action of the first and second guide means as the door moves between the open and closed positions.

In a preferred embodiment, the structure is a vehicle body, the door being provided to provide passenger axis to the interior of the vehicle. The vehicle body may have inner and outer skins, in which case the axis of the arcuate movement may extend between the skins, and, where drive means is provided, this may also be provided between the skins. If the door is controlled by means of one or more door control levers, then at least one of these levers may extend through an opening in the outer skin in the open position of the door.

Similarly, where the first guide comprises upper and lower guide tracks, the upper guide track may be disposed in a channel in the outer skin. The lower guide track may be disposed below a floor of the vehicle.

For a better understanding of the present invention, and to show how it may be carried into effect, reference will now be made, by way of example, to the accompanying drawings, in which.

Figure 1:
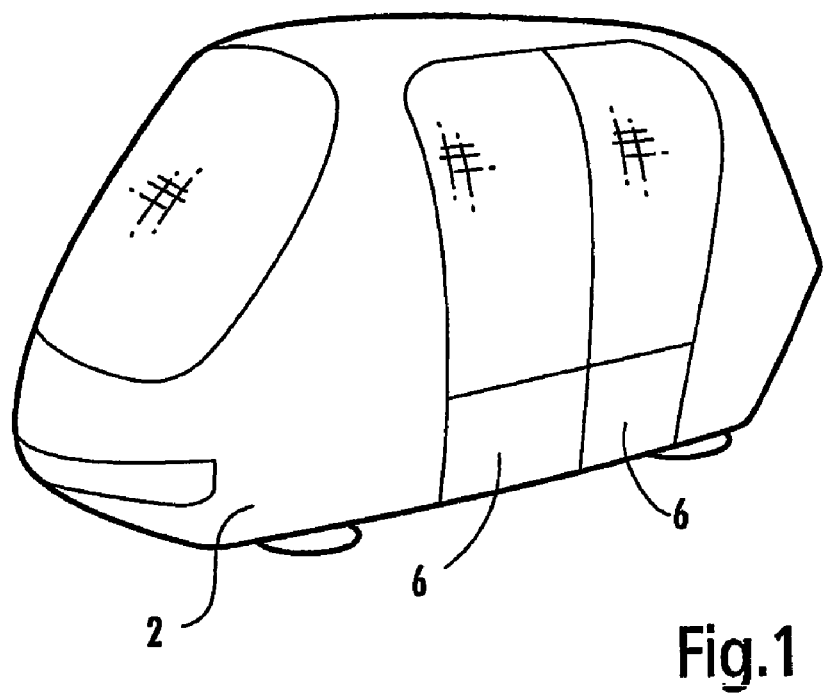
FIG. 1 shows a vehicle with doors in a closed position.
Figure 2:
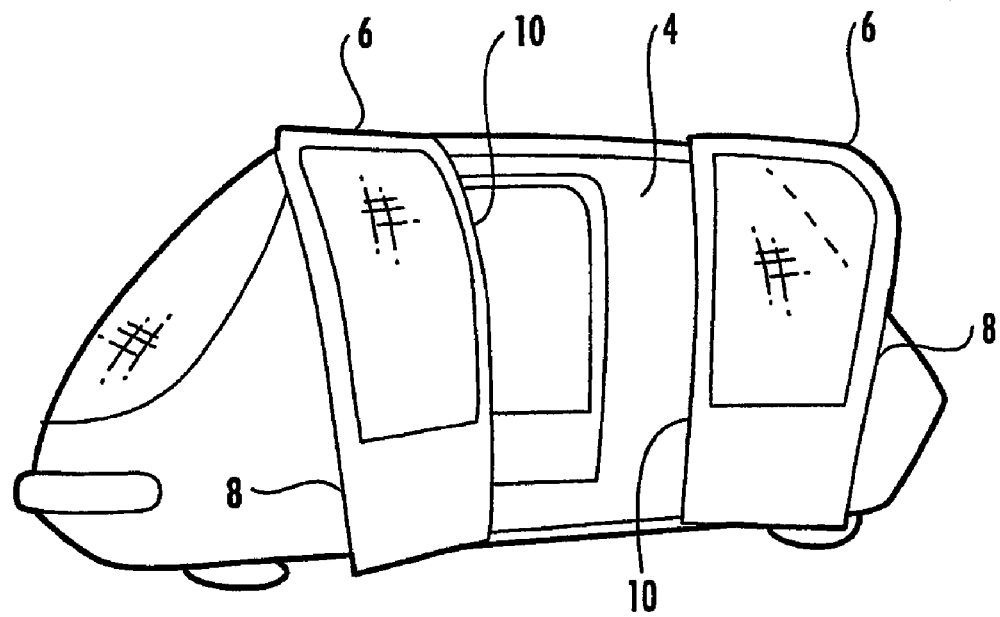
FIG. 2 shows the vehicle with the doors in the open position.

The vehicle shown in FIGS. 1 and 2 is intended for use in urban transport systems. In such a system, a fleet of the vehicles would be available to passengers. The vehicles would be driverless, and would circulate on dedicated trackways provided with appropriate guidance means.

The vehicle comprises a main vehicle structure 2 having a door aperture 4 (preferably one on each side of the vehicle). Each aperture 4 is closed by a pair of doors 6 which can open, as shown in FIG. 2, to provide access to the interior of the vehicle. As shown in FIG. 2, when in the open position, the leading edge 8 of each door (with respect to the direction of movement of the door towards the open position) is displaced outwardly of the door aperture 4 whereas the trailing edge 10 remains substantially in the plane of the door aperture 4. The doors 6 are thus able to open without a significant outward swinging movement. Such swinging movements are undesirable in automatically operated doors, since they could bring the doors into contact with waiting passengers or objects at the side of the vehicle. Also, the oblique positions of the doors when open provides a funnelling effect to direct passengers into the vehicle.

Figure 3:
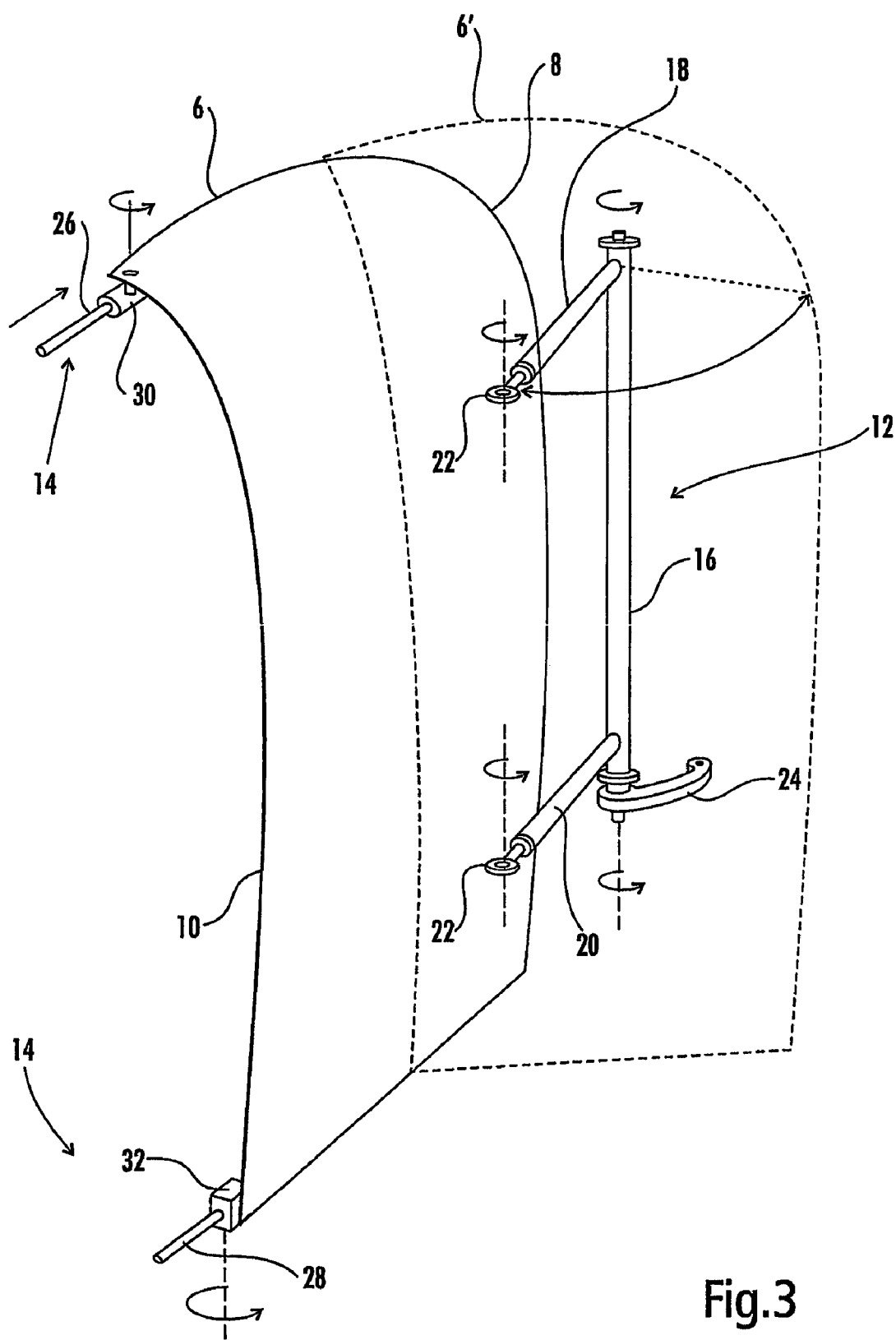
FIG. 3 shows the connections of the door to the mounting structure.

As shown in FIG. 3, the door 6 is supported by first guide means 12 at its leading edge 8, and by second guide means 14 at its trailing edge 10. The first guide means 12 comprises an upright shaft 16 which is supported at top and bottom by bearings (not shown) which are fixed with respect to the vehicle structure 2. Two door control levers 18 and 20 are secured rigidly to the shaft 16 adjacent its top and bottom ends. The two door control levers 18 and 20 extend parallel to each other and are of substantially the same length as each other. Each lever 18, 20 is connected to the door 6 at a position close to the leading edge 8 by means of self-aligning bearings 22.

A drive element in the form of a lever 24 is rigidly secured to the shaft 16 at its lower end. At its end away from the shaft 16, the drive lever 24 is connected to a motor.

The second guide means 14 comprises guide tracks in the form of rails 26 and 28 which are fixed to the vehicle structure 2 towards the top and bottom respectively of the door aperture 4. Sliders 30 and 32 respectively are mounted on the door 6 adjacent its trailing edge 10, and close to its top and bottom edges.

The rails 26, 28 extend parallel to, or almost parallel to, the longitudinal axis of the vehicle and lie in, or close to, the plane of the door opening. The rails 26, 28 are thus parallel to, or almost parallel to, each other, and lie in or close to a common plane which is inclined to the axis of the shaft 16. This is because the door 6 is curved, particularly at its upper end, so that the vertical planes containing the rails 26 and 28 are spaced apart from each other, with the plane containing the rail 26 being displaced in the inboard direction of the vehicle.

It should be noted that the top rail 26 may be slightly curved in order to permit the required movement of the door, and so the expression "almost parallel to" in this context embraces the possibility that deviation from a truly parallel configuration results from such curvature.

The closed and open positions of the door 6 are represented respectively by the solid outline 6 and the dashed outline 6'. As the shaft 16 is rotated by the action of the motor on the drive lever 24, the door control levers 18 and 20 swing outwardly to move the leading edge 8 of the door through an arcuate path which takes it out of the plane of the door aperture 4 and longitudinally away from the door aperture. The trailing edge of the door 10, however, does not move out of the plane of the door opening 4, since it is guided by the rails 26.

Because the rail 26 is situated nearer to the central plane of the vehicle than the rail 28, the rails 26 and 28 do not lie in a plane parallel to the axis of the shaft 16. Consequently, the door 6 will flex as it moves between the open and closed positions. It is consequently necessary for the door to be constructed with sufficient flexibility to allow this flexing to occur without excessive stress on the components. If such flexing is undesirable in any particular application, control of the trailing edge 10 of the door 6 can be achieved with only a single rail 26 or 28 and slider 30 or 32.

Figure 4:
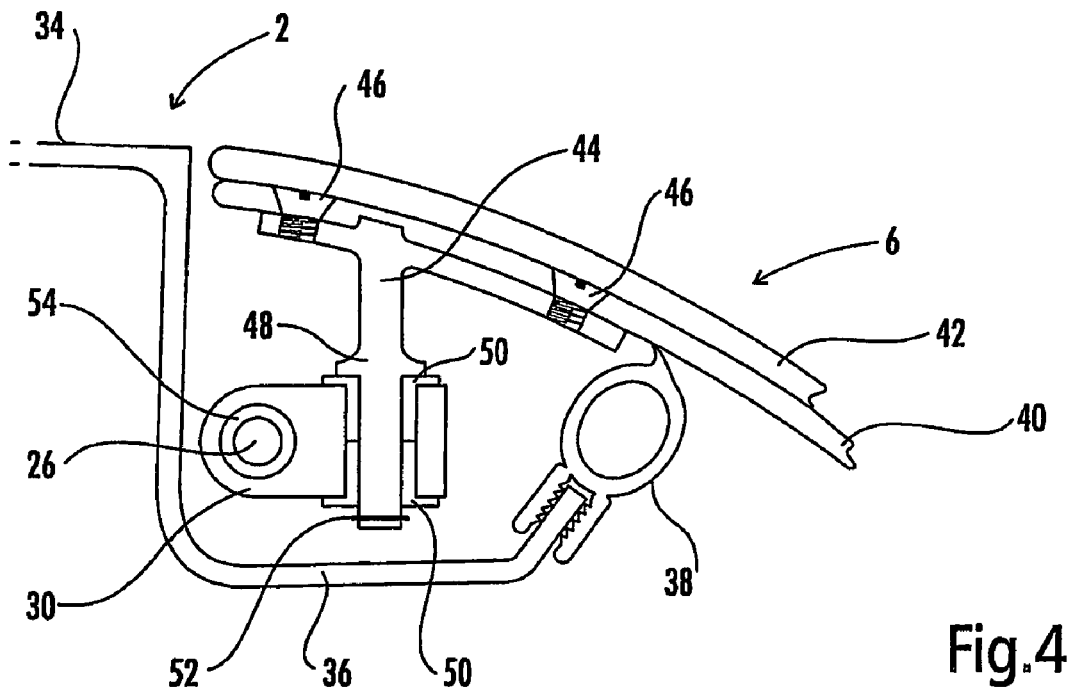
FIG. 4 is a sectional view at an upper region of the door.
Figure 5:
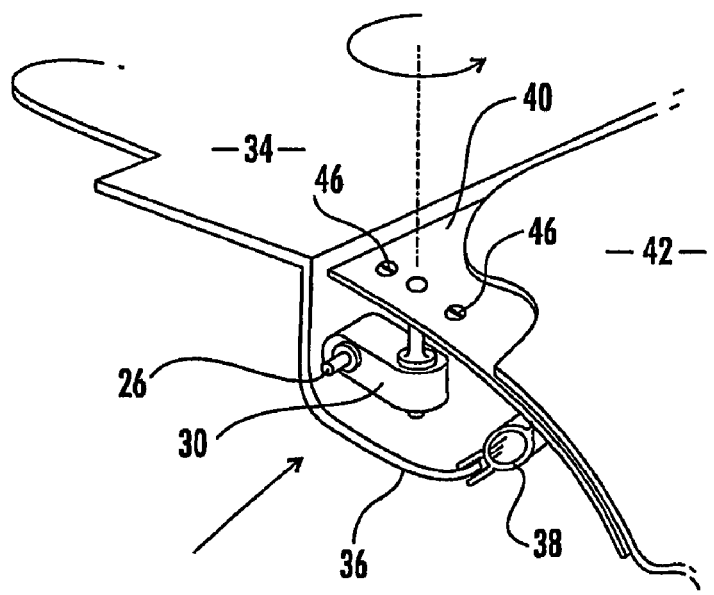
FIG. 5 is a fragmentary view corresponding to FIG. 4.

FIGS. 4 and 5 show in more detail the configuration at the upper end of the trailing edge 10 of the door 6. The vehicle structure 2 comprises an outer skin 34 comprising a roof panel. At the edge of the roof panel 34 bordering the door opening 4, the roof panel 34 is extended to form a channel 36 which terminates at a seal 38.

The door 6 comprises a door frame 40 to which a glass layer 42 is bonded to provide a window. A slide mount 44 is fixed to the door frame 40 by screws 46. The slide mount 44 comprises a spigot 48 on which the slider 30 is pivotably mounted by means of bushes 50. The slider 30 is retained on the spigot 48 by means of a circlip 52. A further bush 54 is retained within the slider 30 for engagement with the rail 26.

Figure 6:
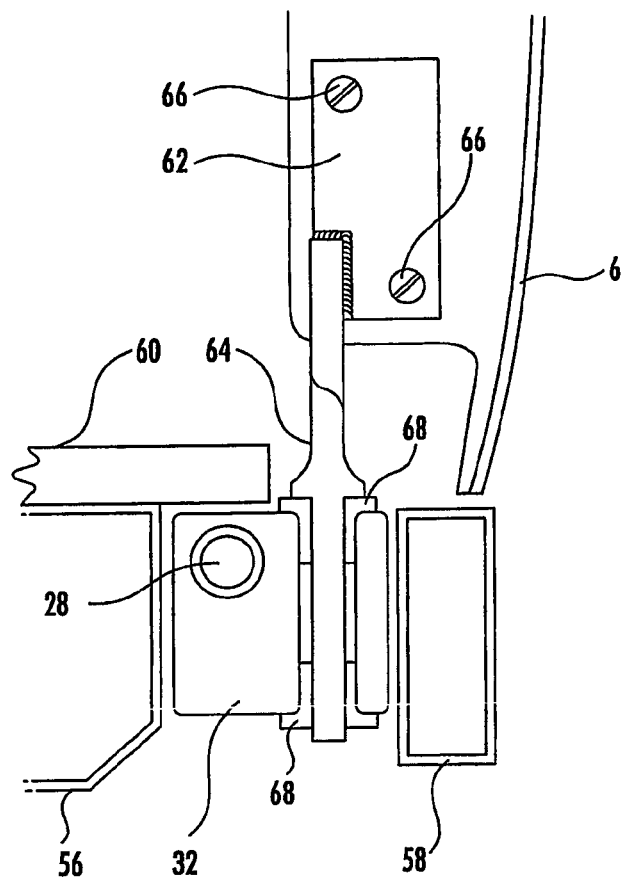
FIG. 6 is a sectional view of a lower region of the door.
Figure 7:
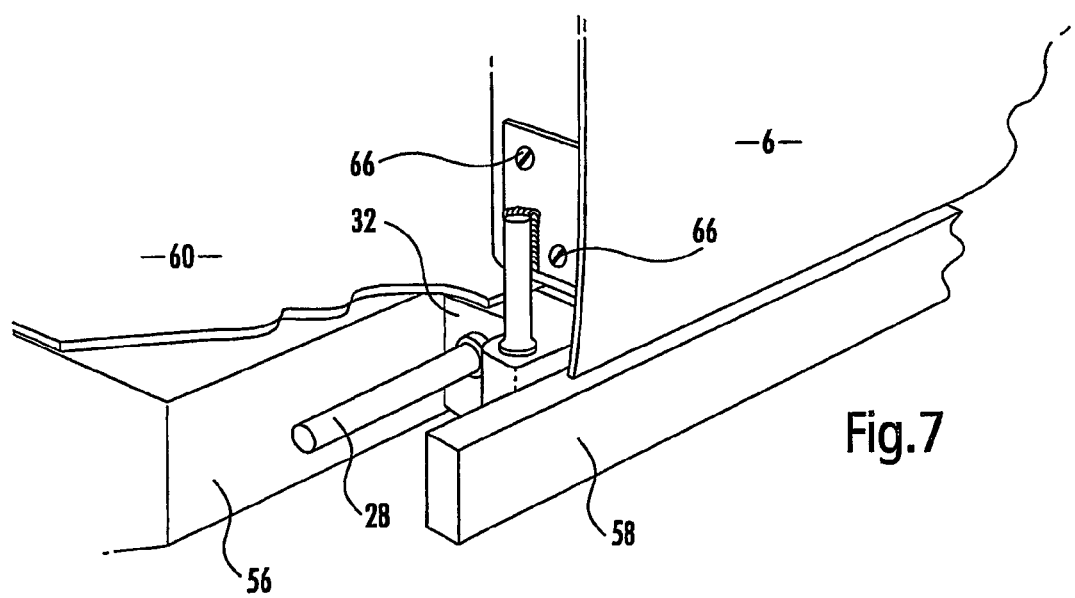
FIG. 7 is a fragmentary view corresponding to FIG. 6.

FIGS. 6 and 7 show in greater detail the structure of the rail 28 and the slider 32 towards the lower end of the trailing edge 10 of the door 6. As shown in FIGS. 6 and 7, the vehicle structure comprises a frame 56 to which a protective beam 58 is fixed. A floor panel 60 is supported by the frame 56. A slider mounting 62 having a spigot 64 is secured to the door 6 by screws 66. The slider 32 is mounted on the spigot 64 by means of bushings 68. A bush 70 is accommodated in the slider 32 to engage the rail 28.

The rails 26 and 28 are secured to the vehicle structure by means which are not shown in the drawings.

It will be appreciated from FIGS. 4 to 7 that the rails 26 and 28 and the associated sliders 30 and 32 operate outside the passenger compartment of the vehicle. The channel 36 shields the upper rail 36 and slider 30 from contact by passengers in the vehicle, while the floor board 60 and the protective beam 58 similarly shields the lower rail 28 and the lower slider 32.

As can be appreciated from FIG. 4, the vehicle structure comprises an outer skin 34. Although not shown, there is also an inner skin which is situated within the outer skin and defines the passenger enclosure. The shaft 16 is disposed between the inner and outer skins, as is the drive lever 24 and the motor connected to it. An opening, for example in the form of a slot, is provided in the outer skin 34 along which each door control lever 18, 20 moves as the door opens. The mechanism associated with the shaft 16 is thus shielded from the passenger compartment.

The invention claimed is:

1. A door mounted on a structure comprising a vehicle body for displacement between an open position and a closed position with respect to a door aperture in the structure, the structure having at least an outer skin and the door being connected to the structure by first guide means, which constrains a leading edge of the door, with respect to movement towards the open position, to execute an arcuate movement about an axis which is fixed to the structure, and by second guide means, which constrains a trailing edge of the door to execute a linear movement substantially parallel to the plane of the door aperture such that the trailing edge of the door remains substantially in the plane of the door aperture, the second guide means comprising a guide element mounted adjacent the trailing edge of the door, the guide element engaging a guide track disposed in a channel formed in the outer skin, the guide track being fixed to the structure.

2. A door as claimed in claim 1, in which the first guide means comprises a door control lever which is mounted at one end for pivoting movement about an axis fixed to the structure, and is connected at the other end for pivotable movement relative to the door.

3. A door as claimed in claim 1, in which the axis of arcuate movement extends upwardly.

4. A door as claimed in claim 2, in which the door control lever is one of two door control levers which are rigidly mounted on a common shaft which is rotatable about the axis.

5. A door as claimed in claim 4, in which the door control levers are connected to the door at the same perpendicular distance as each other from the axis.

6. A door as claimed in claim 5, in which the guide track extends parallel to the door opening.

7. A door as claimed in claim 5, in which the guide track lies generally in a plane which is perpendicular to the axis of arcuate movement.

8. A door as claimed in claim 5, in which the guide track is one of two parallel, or almost parallel, guide tracks which are spaced apart in the direction of the axis of arcuate movement.

9. A door as claimed in claim 8, in which the guide tracks lie in or close to a common plane which is inclined to the axis of arcuate movement.

10. A door as claimed in claim 1, in which the door is curved about a generally horizontal axis.

11. A door as claimed in claim 1, in which the axis of arcuate movement is inside the outer skin.

12. A door as claimed in claim 1, in which the first guide means comprises a door control lever which is mounted at one end for pivoting movement about an axis fixed to the structure, and is connected at the other end for pivotable movement relative to the door.

* * * * *

UNITED STATES PATENT AND TRADEMARK OFFICE
CERTIFICATE OF CORRECTION

PATENT NO. : 7,364,219 B2  Page 1 of 1
APPLICATION NO. : 10/501535
DATED : April 29, 2008
INVENTOR(S) : Martin V. Lowson et al.

It is certified that error appears in the above-identified patent and that said Letters Patent is hereby corrected as shown below:

On the Title Page, Item (75) Inventors should read
--(75)   Inventors:   Martin V. Lowson, Bristol (GB); Paul Bailey, Stroud (GB); Christopher V. Cook, Warks (GB)--.

Signed and Sealed this

Fifth Day of August, 2008

JON W. DUDAS
*Director of the United States Patent and Trademark Office*